(12) United States Patent
Datta et al.

(10) Patent No.: US 7,254,676 B2
(45) Date of Patent: Aug. 7, 2007

(54) PROCESSOR CACHE MEMORY AS RAM FOR EXECUTION OF BOOT CODE

(75) Inventors: Sham M. Datta, Hillsboro, OR (US); Vincent J. Zimmer, Federal Way, WA (US); Kushagra V. Vaid, San Jose, CA (US); William A. Stevens, Folsom, CA (US); Amy Lynn Santoni, Ann Arbor, MI (US)

(73) Assignee: Intel Corporation, Santa Clara, CA (US)

( * ) Notice: Subject to any disclaimer, the term of this patent is extended or adjusted under 35 U.S.C. 154(b) by 400 days.

(21) Appl. No.: 10/295,406

(22) Filed: Nov. 15, 2002

(65) Prior Publication Data

US 2004/0098575 A1 May 20, 2004

(51) Int. Cl.
*G06F 12/00* (2006.01)
(52) U.S. Cl. ...................................... 711/118
(58) Field of Classification Search ............... None
See application file for complete search history.

(56) References Cited

U.S. PATENT DOCUMENTS

| | | | |
|---|---|---|---|
| 5,809,531 A * | 9/1998 | Brabandt | 711/141 |
| 6,044,478 A | 3/2000 | Green | |
| 6,463,509 B1 | 10/2002 | Teoman et al. | |
| 6,606,686 B1 * | 8/2003 | Agarwala et al. | 711/129 |
| 6,842,857 B2 * | 1/2005 | Lee et al. | 713/2 |
| 2002/0184352 A1 * | 12/2002 | Jain et al. | 709/223 |

FOREIGN PATENT DOCUMENTS

EP 1098249 5/2001

OTHER PUBLICATIONS

PCT Search Report, PCT/US03/34808, mailed Feb. 21, 2006.

* cited by examiner

*Primary Examiner*—Mano Padmanabhan
*Assistant Examiner*—Duc T Doan
(74) *Attorney, Agent, or Firm*—Blakely, Sokoloff, Taylor & Zafman LLP

(57) ABSTRACT

In one embodiment, a computer boot method allows choosing a predetermined data block alignment for a cache that has multiple cross processor interactions. A cache RAM column of a cache as RAM system is loaded with a tag to prevent unintended cache line evictions, and boot code is executed, with the preloaded cache RAM appearing to the executing boot code stream as a memory store.

30 Claims, 4 Drawing Sheets

PROCESSOR CACHE MEMORY AS RAM FOR EXECUTION OF BOOT CODE

FIELD OF THE INVENTION

The present invention relates to computing systems. More particularly, the present invention relates execution of boot code.

BACKGROUND

Loading an operating system traditionally requires boot or "initial program load" code. Historically, such code executed at least in part on a computer system prior to permanent memory initialization, and accordingly must be written to work in a memory-less environment. For a typical computing platform today, the early BIOS or firmware often runs in a mode called "stackless assembly" with no memory store into which a call stack can be initialized. Unfortunately, such stackless assembly language startup code is non-portable and very fragile with respect to maintenance and feature enhancement. Also, because of the limited available state and the crude programming environment, it is difficult to add features or to implement useful algorithms, such as cryptographic computations to authenticate firmware components.

Problems associated with the early boot code are particularly acute when modern 64 bit processors (including the Itanium Processor Family) are used in a computing system. The amount of code that needs to be handcrafted in assembly language is extremely large. Also, in the context of a modern BIOS architecture like the available Extensible Firmware Interface (e.g. EFI based Tiano Firmware), this early code must complete complex activities such as parsing the firmware file system metadata to find the Plug-In Environment Initialization Modules (PEIMs) and evaluate dependencies for purposes of legal module dispatch, etc. These latter tasks were never required in a legacy BIOS stackless environment and are difficult to implement in register-only environment.

BRIEF DESCRIPTION OF THE DRAWINGS

The inventions will be fully from the detailed description given below and from the accompanying drawings of embodiments of the inventions which, however, should not be taken to limit the inventions to the specific embodiments described, but are for explanation and understanding only.

DETAILED DESCRIPTION

Figure 1:
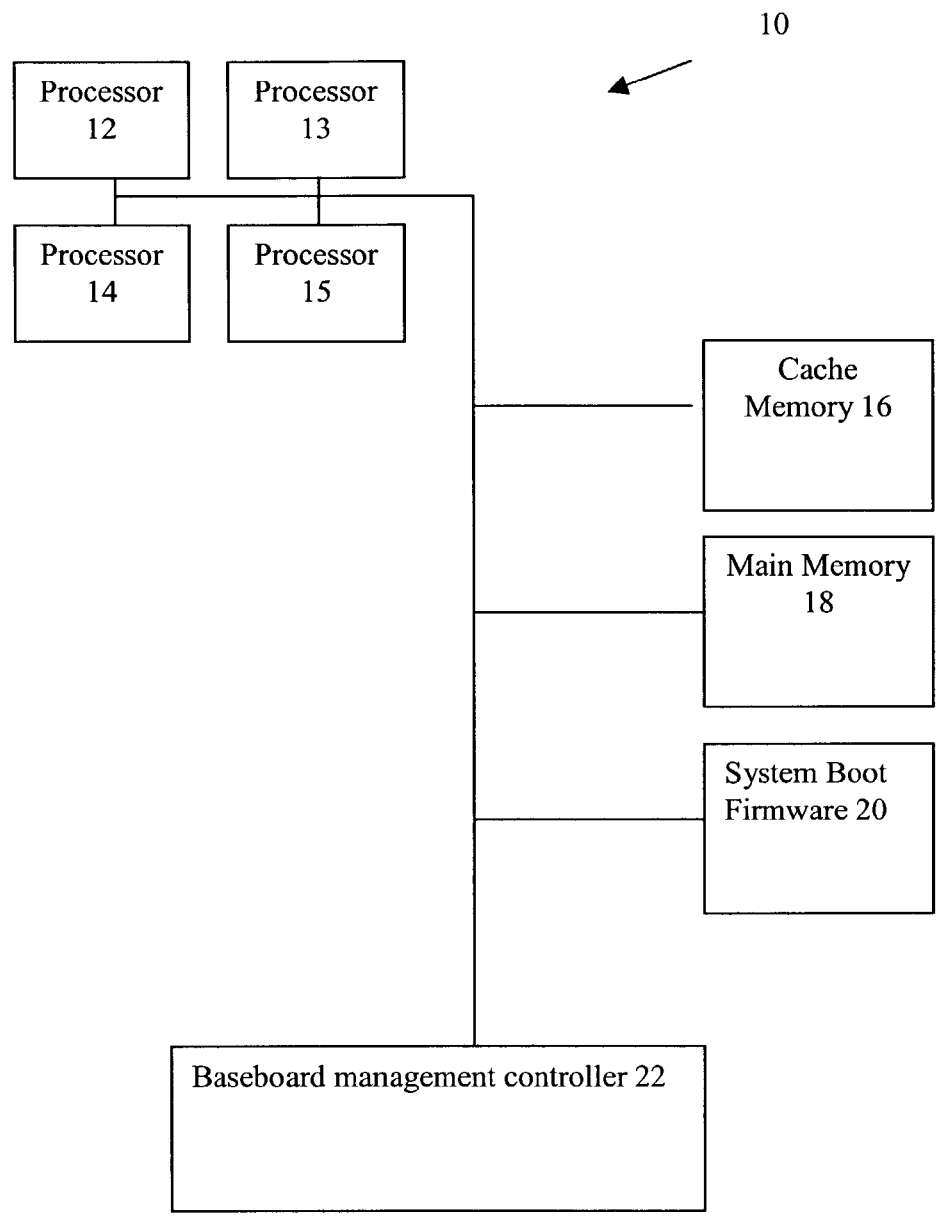
FIG. 1 schematically illustrates a multiple processor system.

As seen with respect to FIG. 1, a system 10 for booting a computer includes multiple processors 12, 13, 14, and 15. These processors are suitable for executing programming code (including Basic Input/Output System (BIOS) instructions, operating system instructions, and application code), and interconnected and controlled in part by a baseboard management controller 22. The processors are further connected to a high-speed local cache memory 16 and a somewhat slower main memory 18. System BIOS is loaded from connected updateable firmware memory 20.

The link connection can be general information input/output lines, conventional addressable busses, or dedicated serial or parallel data traces. The baseboard management controller 22 typically manages the interface between system management software and the platform management hardware, provides autonomous monitoring, event logging, and recovery control, and serves as the gateway between system management software and supported bus systems interconnecting platform components. A baseboard management controller can be integrated into a variety of computing platforms that have different management features, and can include a single integrated component on a motherboard, or alternatively be represented by a distributed system collectively composed of multiple discrete controllers. For example, a complex, multi-board set in an enterprise-class server can use multiple management controllers for monitoring the different subsystems such as redundant power supply monitoring and control, RAID, expansion I/O, etc. In operation, the baseboard management controller 22 functions as policy agency that decides which processor to apply power-on reset to, when to assert INIT and NMI, when to initiate or terminate boot processes, etc.

Examples of a system 10 include, but are not limited or restricted to a computer (e.g., desktop, a laptop, a server, blade server, a workstation, a personal digital assistant, etc.) or any peripherals associated therewith; communication equipment (e.g., telephone handset, pager, etc.); a television set-top box and the like. A "connection" or "link" is broadly defined as a logical or physical communication path such as, for instance, electrical wire, optical fiber, cable, bus trace, or even a wireless channel using infrared, radio frequency (RF), or any other wireless signaling mechanism. In addition, the term "information" is defined as one or more bits of data, address, and/or control. "Code" includes software or firmware that, when executed, performs certain functions. Examples of code include an application, an applet, boot code, or any other series of instructions.

Figure 2:
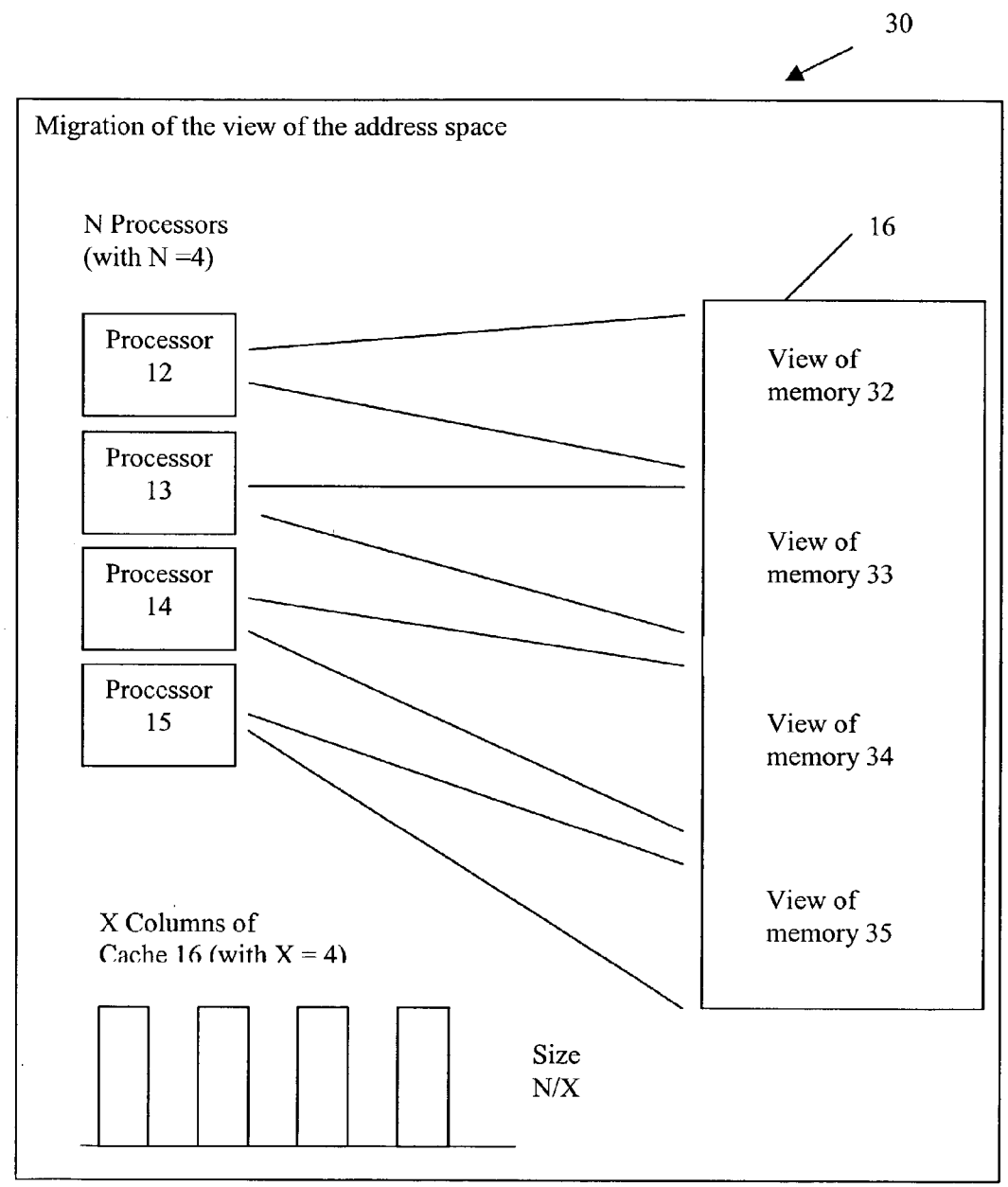
FIG. 2 illustrates migration of memory during boot of multiple processors.

As seen in FIG. 2 with respect to the cartoon 30 showing address migration in multiprocessor system, a unified cache 16 of size of "N" bytes designed with a set associativity of "X" ways can be visualized to be comprised of an array of "X" columns, each having a size of "N/X" bytes. To boot such a computer from cache memory, data block alignment for a cache is chosen to be N/X. At least one cache RAM column of a cache is preloaded as RAM system, using a tag to prevent unintended cache line evictions. Boot code is then executed, with the preloaded cache RAM respectively appearing to the executing boot code streams as a memory stores 32, 33, 34, and 35.

Such cache as RAM (CAR) software can choose a data address range so that it does not conflict with any pre-defined platform address ranges. Data block alignment is made using a hand-off register to convey implementation cache size N and set associativity X. Alternatively, data block alignment can be made using a procedure call to determine implementation cache size N and set associativity.

In certain embodiments, in order for the cache memory of such a high performance processor to be used as RAM by early boot code, the cache RAM must appear to the executing code stream as a memory store such that all data memory accesses are a hit and cause no cache evictions. The "no evictions" is important in that an eviction would entail a write-back to main memory prior to the memory controller and system fabric having been initialized. In the best case, the aforementioned action would have no side effect, in the worst case, the system could lock up or engender a fault condition such as machine-check abort. Hence the support mechanism from the processor during CAR mode must be such that there are no front side bus (FSB) cycles to the data address space.

Figure 3:
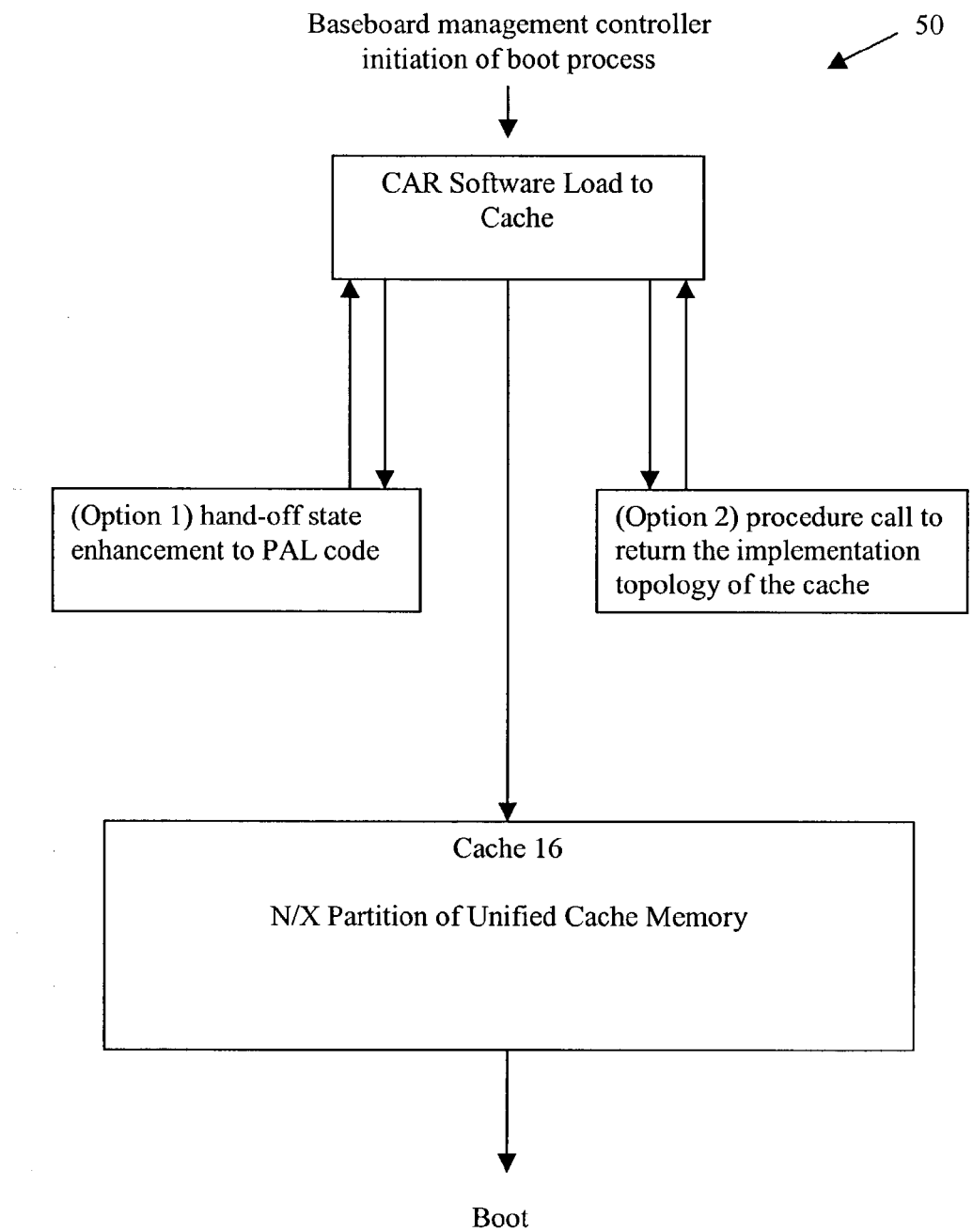
FIG. 3 illustrates several possible interactions between cache as RAM (CAR) software and a Processor Abstraction Layer (PAL)

In some embodiments, such as shown with respect to FIG. 3, CAR software can use specific methods provided by a Processor Abstraction Layer (PAL) to ensure that no FSB cycles are initiated, and that data block alignment is made using a hand-off register to convey implementation cache size N and set associativity X. This PAL code layer is produced by the processor vendor and contains processor initialization code and a call interface that abstracts the processor hardware, including available processor caches. PAL software can pre-load one or two (as many needed) cache RAM columns with proper tags. Once this is done there will not be any unintended cache line evictions and hence no front side bus cycles, as long as CAR software does not exceed maximum size restrictions. Depending on the specific processor implementation, the PAL based method that pre-loads the cache with tags for data usage may choose a cache area (column) that will NOT be evicted for the given maximum CAR code size and hence enabling us to run the code stream cached.

The PAL based methods may involve some hardware support from the processor, or they can alternatively be implemented directly in PAL code. In certain embodiments, a new PAL call and a hand-off state enhancement to PAL code can be used. The hand-off state enhancement adds a new hand-off register that conveys the implementation topology of the cache (the N and X parameters discussed above) to the CAR setup code that is part of the firmware code that interfaces with PAL code. Alternatively, the PAL code could support a procedure call for data block alignment that directly provides implementation cache size N and set associativity, instead of modifying the hand off state. In this embodiment, CAR setup-code uses the information to choose the CAR data block position and alignment.

In certain embodiments, use of the new PAL call is one of the ways in which the PAL layer is indicated to choose and load the cache area of needed size with proper tag bits. The inputs to this new PAL call are the size and address range of CAR data and the maximum size of CAR code. Use of PAL based methods also permits isolation of the CAR setup code from any future developments to processor cache architecture, since PAL based methods abstract all the implementation details of the processor cache.

Use of CAR also allows for support of multiple processors in a concurrent execution mode while using the MESI (Modified/Exclusive/Shared-/Invalid) cache coherency protocol and the model of computation required to leverage this CAR capability. This is particularly useful where all processors come out of reset concurrently, and a fill SMP (symmetric multiprocessing) topology must be visible in software. Now in SMP, the MESI protocol would try to maintain cache coherence if all of the processing agents where to access the same cache line. The MESI is unlike the newer protocols, such as MOESI (Modified/Owned/Exclusive/Shared-/Invalid), in that the latter has the ability to transfer a cache line from one processor to another. In the case of MESI, the write-back always occurs prior to the line being updated in the alternate processor.

Accordingly, CAR support requires partitioning of the address range used for the CAR data region. Specifically, if each processor needs to support 256 K CAR data area that is useable in this no-eviction mode, and there are a maximum of four processors in the local SMP complex, then the CAR data address space would be partitioned such that each processor can see only it's 256 kb area. In other words, PAL/processor supplied methods fill unique tag bits into each processor cache in such a way that they each operate with in their own 256 K area. The view that each processor has of the stack would be a unique address, where the address plus 256 kb extent would not overlap with any of the other extents of the 3 peer processors. Hence there is no chance of updating any data record that belongs to another processor data space which means that there would no inter-processor synchronization issues although each may be executing at it's own pace. The cache contains records that are not modified at the same data address space for all the processors and hence does not cause any issues.

In one typical embodiment partially illustrated with respect to flowchart 50 of FIG. 3, the CAR setup code receives information about the size of the CAR and the organization (Number of ways) from PAL-A layer as part of hand-off state. It will calculate the minimum alignment criteria for data by dividing the L2 cache size by the number of ways the cache is organized. It also knows the maximum size of data and the length of the CAR code from platform services module. Then it invokes the PAL-A CAR service call PAL_CAR_INITIALIZE to let PAL-A select and initialize an area of cache as RAM for use as data area by CAR software. The CAR mode is temporarily used by the boot code until the permanent memory is found and initialized. After such a stage, all needed data is copied from CAR to real memory and CAR mode is exited. To exit CAR mode, the call is made with input arguments Data_Address, Data_Size and Code Size all set to NULL. At this time, the call will remove the hardware workarounds, so that the processor cache is full featured when CAR mode is exited. Hence there is no detrimental effect of our invention on normal processor operating mode under the control of operating system (OS).

More specifically, the foregoing methods work in conjunction with Intel Itanium Processor Family (IPF) processors that can be modified to use the cache as RAM in a Tiano or Tiano-like implementation of an Extended Firmware Interface (EFI). From a software perspective, the available cache as RAM (CAR) will be used for following three purposes. The first chunk is to supply a 64 KB of Backing Store Pointer (BSP) for local stacked registers. The second chunk goes to configure a 128 KB of (R12 as data stack pointer) stack for the C-compiler to generate stack-based activation frames data usage. The third 64 KB chunk of linear mapped RAM that is addressable as a global heap allows for modular configuration of system RAM.

In operation, the part of the cache that is being used as CAR must be able to be configured and used so as to never replace/invalidate data written to it by software until explicitly instructed to by software. In other words, the cache that is being used as CAR ensure that:
1. All data loads are always read from cache and do not generate front side bus (FSB) cycles.
2. Cache data read misses may update the cache.
3. Cache write hits always update the cache, though it may generate FSB cycles.
4. Cache-write misses may update the cache and may access memory to ensures cache write misses do not occur.
5. Cache lines are never replaced or invalidated; although code cache lines may be replaced.

Figure 4:
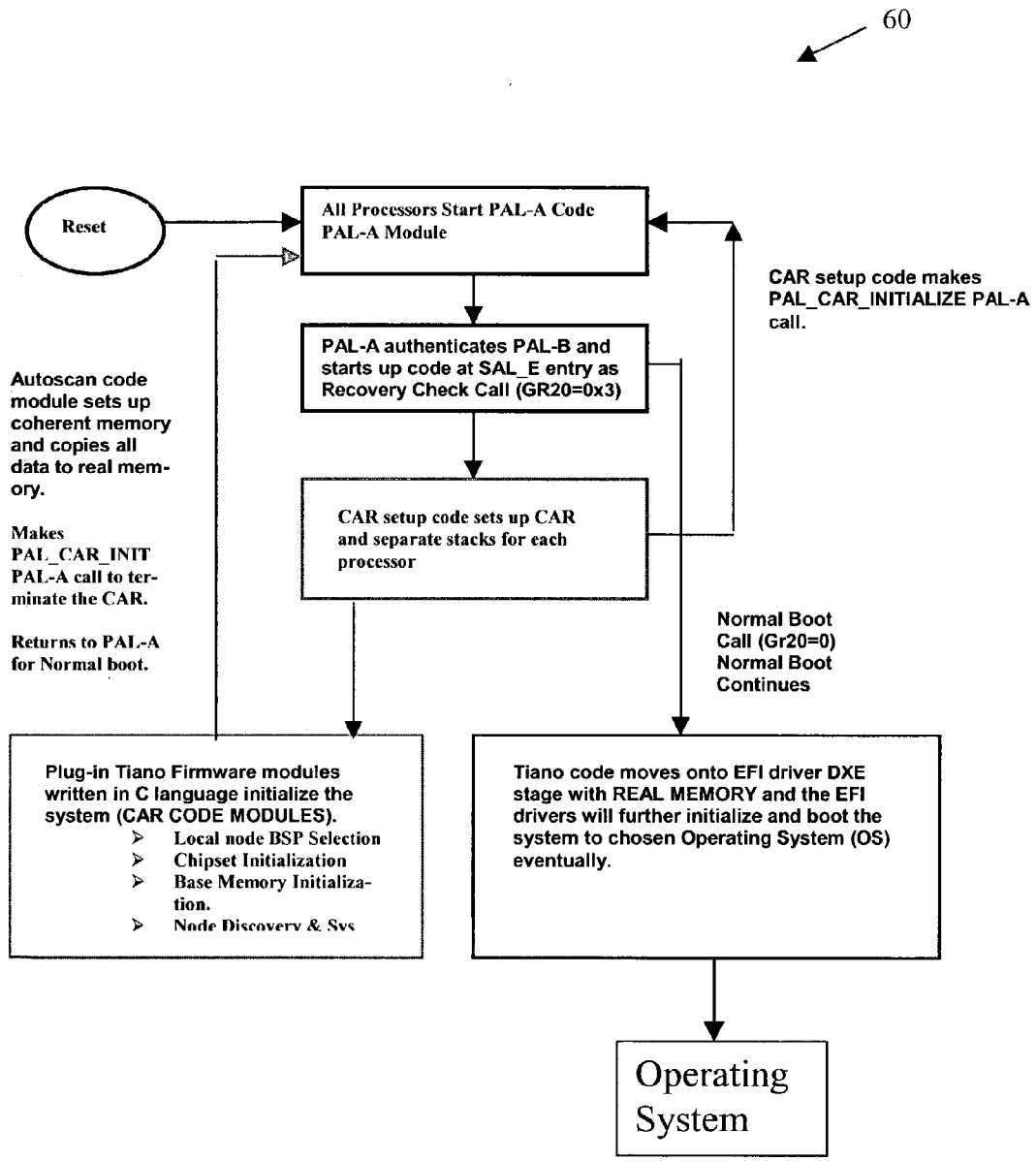
FIG. 4 illustrates one embodiment suitable for Itanium Family Processors (IPF) of an interaction between cache as RAM (CAR) software and a Processor Abstraction Layer (PAL).

As seen generally with respect to the boot process flow chart 60 of FIG. 4, in typical IPF architecture all processors will be executing firmware code until the code selects a Boot Strap Processor (BSP). So, during the period when all the processors are executing firmware code it is possible that CAR between the processors will become incoherent. Keeping the CARs across all processors coherent is not a requirement. It may be noted that firmware code may choose to work in the non-coherent model by appropriately choosing different CAR addresses for each of the processor.

The cache and memory controller must be configured and used so as not to cause unwanted memory cycles on the memory interface prior to or during memory initialization. Boundary conditions in the un-initialized chipset may result in memory cycles from the FSB targeting the memory interface to hang the memory controller or change it's state such that it cannot work properly. The "garbage" data in the cache upon start up must be invalidated by the early PAL-A code without resulting in memory cycles to the chipset's memory interface. If for some reason PAL-A code does not invalidate the cache before transferring, then it must support PAL_CACHE_INIT call inside PAL-A layer.

In many IPF processors a cache-write hit will generate front bus cycles. In order to avoid generation of FSB cycles, software using CAR will pre-load the caches with appropriate TAG values after invalidating the cache. PAL-A layer shall not only pass on cache information bits, but also provide a method to load the caches with necessary data so that FSB cycles can be completely avoided. This is particularly important for processors subject to "back-snoop-me" condition where a cache line that is victimized from L1 is put on the FSB even though it is present in the L2, and should have been written back to the L2. This unexpected FSB transaction for the L1 victim write-back can cause incorrect CAR operation. This condition can be worked around by using a PAL call to configure the L1 cache as an in-order, one access at a time design.

To ensure consistent and reliable operation of the processor's cache as a temporary data store during system memory initialization, the following requirements and restrictions must be observed by the initialization algorithm. The firmware must allow for this mechanism to change, and be able to handle all scenarios when it does change. The firmware that performs the initialization is generally a separately updateable module as seen with respect of FIG. 1.

PAL-A must initialize the L2 cache needed by CAR software by either invalidating the early garbage data in the cache before handing it over to EFI code (at SALE_ENTRY) or it must support a method of invalidating the caches, so that the CAR setup module can invalidate the cache. PAL-A code also must provide information about L2 cache size, and the number of ways (associativity) of L2 cache to the CAR code module to allow CAR module to choose optimum CAR data address and supply it to the PAL method, so that the PAL can load corresponding tag information into the cache. This can be either done as hand off information to CAR code at the time of PAL-A handoff to SALE_ENTRY or by supporting a procedural call to enable CAR code to load the cache with right tags for the CAR data.

All the processors come out of PAL-A to do a recovery check on the system. The code flow during this cycle finds memory and determines if a recovery of either PAL-B or the system software is needed or not. If a recovery action is not needed, then all the processors are returned to PAL code for further testing and initialization. Once this is completed by PAL-B, all the processors are returned to SALE_ENTRY for a normal boot. The caches need not be kept coherent during this code transition into PAL-B and back. In other words, PAL code owns the caches for initialization and testing when control is with in PAL code. The Tiano dispatcher code always starts fresh and builds it's variables every time it starts up.

Multiple logical CPUs in multi-threaded and multi-core packages are treated as separate processors by the CAR based firmware and are allotted their own non-overlapping CAR data areas. In such cases the total CAR data area requirement on the CPU package is the sum of the sizes of all the individual CAR data areas. It may also be noted that this requirement can easily be met, since the multi-core CPUs also generally possess larger L2 caches.

All the data that the CAR based software needs must reside only with in the allocated contiguous CAR address space allocated for a particular platform. The stack-based data, backing store pointer-addressed area, and any global data area must all fit within this paradigm. The start of this data block address will have an alignment restriction that may be different for different processors. The total CAR based software and data length in bytes must not exceed the total CAR cache length available for use as IPF processors have unified cache architectures. In a multi-processor (MP) system the CAR software does not assume that the data is coherent across the processors in a node. This means that CAR software does not exercise any MP semaphores in the CAR data area and depend on them. However CAR software may use chipset and other hardware resources to implement semaphores and other MP code execution control mechanisms. If the CAR based software needs to write to real memory controlled by the node memory controller for any purpose (like sizing or tuning memory), it must do so as an un-cached access. This means turning on the bit 63 if the code is operating in physical mode or setting up a proper TC entry in case of the virtual addressing mode.

As previously noted, CAR software can choose the data block alignment to be of "N/X" bytes. The CAR software chooses a data address for CAR DATA and then pre-loads (using methods provided by PAL-A) one or two (as many needed) data columns with proper tags. In 1FF processors, the remaining cache columns cannot be used for executing code due to the nature of operation of pseudo-LRU algorithms that are used to control the access of L2 cache lines. If the start of the CAR code is NOT aligned to "N/X" bytes like data column, then the effective code size may be reduced by a maximum of:

(Size of the Cache Columns)-(One Cache Line Size).

If this is tolerable, then it is not necessary to align the CAR code. CAR_ATA is always aligned to the required limit. Also, the address range should be set not to conflict with the largest address range consumed by the platform. The largest range is generally the highest addressable memory and possible allocated PCI ranges of the system. The chosen address range is selected to not conflict with the other architectural address ranges of IPF based processors. These ranges include address ranges chosen for IO block, IPI address block, ROM and chipset reserved address ranges.

Implementation of the foregoing methods and procedures facilitates adherence to various processor security requirements, including but not limited to secure boot methods commonly being enforced on today's computing platforms. As will be appreciated, such boot techniques pose programming complexities that can not be handled by a memory-less environment. Most of the security algorithms, like Secure Hash Algorithms (SHA), need a few KB of memory to operate on security keys, which is available using cache as RAM as described.

In addition, present day computing platforms also have very complex bus topologies that need to be initialized very early before memory can be found. The initialization of bus structures like USB (Universal Serial Bus) needs several command and status bytes to be streamed to and from the bus controller devices. Similarly, high-density memory technologies also demand very complex initialization and size scanning algorithms. These operations are simplified in an environment supporting stacks and at least a limited memory, with an additional benefit arising from the ability to use ISA (Instruction Set Architecture) architecture independent higher level language like C (or equivalent) code. This allows, for example, reuse of software applicable to common hardware blocks between 32 bit Intel architecture processor system designs and IPF (IA-64) based systems.

Software implementing the foregoing methods and system can be stored in the memory of a computer system as a set of instructions to be executed. In addition, the instructions to perform the method and system as described above could alternatively be stored on other forms of machine-readable media, including magnetic and optical disks. For example, the method of the present invention could be stored on machine-readable media, such as flash memory, magnetic disks, or optical disks are accessible via a disk drive (or computer-readable medium drive). Further, the instructions can be downloaded into a computing device over a data network in a form of an executable version for self-installation.

Alternatively, the logic to perform the methods and systems as discussed above, could be implemented in additional computer and/or machine readable media, such as discrete hardware components as large-scale integrated circuits (LSI's), application-specific integrated circuits (ASIC's), or firmware such as electrically erasable programmable read-only memory (EEPROM's); or spatially distant computers relaying information through electrical, optical, acoustical and other forms of propagated signals (e.g., radio waves or infrared optical signals).

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude being more than one of the additional element.

Those skilled in the art having the benefit of this disclosure will appreciate that many other variations from the foregoing description and drawings may be made within the scope of the present invention. Accordingly, it is the following claims including any amendments thereto that define the scope of the invention.

The claimed invention is:

1. A method, comprising:
    setting a data block alignment for a cache to be N/X bytes when a cache as RAM (CAR) system on the cache includes an implementation a cache size N and a set associativity of up to X-way interactions;
    preloading, as part of the CAR system, at least one column of the cache as cache random access memory (RAM), wherein the cache RAM corresponds to the data block alignment;
    using a tag to prevent cache line evictions from the cache RAM; and
    executing a boot code stream with the cache RAM appearing to the executing boot code stream as a memory store for the executing boot code stream.

2. The method of claim 1, further comprising choosing, by cache as RAM (CAR) software controlling the cache RAM, a data address range of the cache that does not conflict with any pre-defined platform address ranges.

3. The method of claim 1, further comprising choosing the data block alignment using a hand-off register to convey the implementation cache size N and the set associativity X to a Processor Abstraction Layer.

4. The method of claim 3, further comprising choosing the data block alignment using a procedure call by the Processor Abstraction Layer to determine the implementation cache size N and the set associativity X.

5. The method of claim 4, further comprising the procedure call using inputs including size and address range of data in the cache RAM and maximum size of the cache RAM.

6. The method of claim 1, wherein all data loads are read from the cache to limit generation of front side bus cycles.

7. The method of claim 1, wherein all data loads generated by the executing boot code are read from the cache to limit generation of front side bus cycles.

8. The method of claim 1, wherein cache write hits generated by the executing boot code always update the cache.

9. The method of claim 1, wherein the executing boot code provides early initialization of one or more processors and selection of a boot strap processor.

10. The method of claim 1, further comprising execution of boot code for multiple processors by partitioning data space of the cache into the cache RAM so that each processor of the multiple processors is limited to its own area of the cache with associated cache RAM.

11. An article of manufacture, comprising a machine-accessible storage medium having stored thereon instructions that, when executed by a machine, result in the machine performing operations comprising:
    setting a data block alignment for a cache to be N/X bytes when a cache as RAM (CAR) system on the cache includes an implementation cache size N and a set associativity of up to X-way interactions;
    preloading, as part of the CAR system, at least one column of the cache as cache random access memory (RAM), wherein the cache RAM corresponds to the data block alignment;
    using a tag to prevent cache line evictions from the cache RAM; and
    executing a boot code stream with the cache RAM appearing to the executing boot code stream as a memory store for the executing boot code stream.

12. The article of manufacture according to claim 11, wherein the instructions, when executed by a machine, result in the machine performing further operations comprising choosing, by cache as RAM (CAR) software controlling the cache RAMS, a data address range of the cache that does not conflict with any pre-defined platform address ranges.

13. The article of manufacture according to claim 11, wherein the machine-accessible storage medium further includes instructions, if executed, results in the machine further performing choosing the data block alignment using a hand-off register to convey the implementation cache size N and the set associativity X to a Processor Abstraction Layer.

14. The article of manufacture according to claim 13, wherein the machine-accessible storage medium further includes instructions, if executed, results in the machine performing choosing the data block alignment using a procedure call by the Processor Abstraction Layer to determine the implementation cache size N and the set associativity X.

15. The article of manufacture according to claim 14, wherein the machine-accessible storage medium further includes instructions, if executed, results in the machine further performing the procedure call using inputs including size and address range of data in the cache RAM and maximum size of code of the cache RAM.

16. The article of manufacture according to claim 11, wherein all data loads are read from the cache to limit generation of front side bus cycles.

17. The article of manufacture according to claim 11, wherein all data loads generated by executing boot code are read from the cache to limit generation of front side bus cycles.

18. The article of manufacture according to claim 11, wherein cache write hits generated by the executing boot code always update the cache.

19. The article of manufacture according to claim 11, wherein the executing boot code provides early initialization of one or more processors and selection of a boot strap processor.

20. The article of manufacture according to claim 11, wherein the machine-accessible storage medium further includes instructions, if executed, results in the machine performing execution of boot code for multiple processors by partitioning data space of the cache into the cache RAM so that each processor of the multiple processors is limited to its own area of the cache with associated cache RAM.

21. A system, comprising:
a cache as RAM (CAR) software module that:
sets a data block alignment for a cache to be N/X bytes when a cache as RAM (CAR) system on the cache includes an implementation cache size N and a set associativity of up to X-way interactions;
preloads, as part of the CAR system, at least one column of the cache as cache random access memory (RAM), wherein the cache RAM corresponds to the data block alignment;
uses a tag to prevent cache line evictions from the cache RAM; and
a processor including the cache RAM for executing a boot code stream with the cache RAM appearing to the executing boot code stream as a memory store for the executing boot code stream.

22. The system of claim 21, wherein CAR software module further chooses a data address range of the cache that does not conflict with any pre-defined platform address ranges.

23. The system of claim 21, wherein choosing the data block alignment uses a hand-off register to convey the implementation cache size N and the set associativity X to a Processor Abstraction Layer.

24. The system of claim 23, wherein choosing the data block alignment uses a procedure call by the Processor Abstraction Layer to determine the implementation cache size N and the set associativity X.

25. The system of claim 24, further comprising the procedure call using inputs including size and address range of data in the cache RAM and maximum size of code of the cache RAM.

26. The system of claim 21, wherein all data loads are read from the cache to limit generation of front side bus cycles.

27. The system of claim 21, wherein all data loads generated by the executing boot code are read from the cache to limit generation of front side bus cycles.

28. The system of claim 21, wherein cache write hits generated by the executing boot code always update the cache.

29. The system of claim 21, wherein the executing boot code provides early initialization of one or more processors and selection of a boot strap processor.

30. The system of claim 21, further comprising execution of boot code for multiple processors by partitioning data space of the cache RAM so that each processor of the multiple processors is limited to its own area of the cache with associated cache RAM.

* * * * *

UNITED STATES PATENT AND TRADEMARK OFFICE
CERTIFICATE OF CORRECTION

| | |
|---|---|
| PATENT NO. | : 7,254,676 B2 |
| APPLICATION NO. | : 10/295406 |
| DATED | : August 7, 2007 |
| INVENTOR(S) | : Datta et al. |

It is certified that error appears in the above-identified patent and that said Letters Patent is hereby corrected as shown below:

In column 1, at line 28, delete "modem" and insert --modern--.

In column 6, at line 39, delete "1FF" and insert --IPF--.

Signed and Sealed this

Fourteenth Day of April, 2009

JOHN DOLL
*Acting Director of the United States Patent and Trademark Office*